US011831230B2

(12) United States Patent
Ichiki et al.

(10) Patent No.: US 11,831,230 B2
(45) Date of Patent: Nov. 28, 2023

(54) POWER SUPPLY, MOTOR DRIVER, BLOWER, COMPRESSOR, AND AIR CONDITIONER

(71) Applicant: Mitsubishi Electric Corporation, Tokyo (JP)

(72) Inventors: Satoru Ichiki, Tokyo (JP); Yuya Kondo, Tokyo (JP); Koichi Arisawa, Tokyo (JP); Kenji Iwazaki, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 373 days.

(21) Appl. No.: 17/420,071

(22) PCT Filed: Feb. 25, 2019

(86) PCT No.: PCT/JP2019/007058
§ 371 (c)(1),
(2) Date: Jun. 30, 2021

(87) PCT Pub. No.: WO2020/174531
PCT Pub. Date: Sep. 3, 2020

(65) Prior Publication Data
US 2022/0006383 A1      Jan. 6, 2022

(51) Int. Cl.
*H02M 3/158*   (2006.01)
*H02M 1/00*    (2006.01)
(Continued)

(52) U.S. Cl.
CPC ....... *H02M 3/1586* (2021.05); *H02M 1/0009* (2021.05); *H02M 1/32* (2013.01); *H02P 25/02* (2013.01); *H02P 27/06* (2013.01)

(58) Field of Classification Search
CPC .... H02M 3/1586; H02M 1/0009; H02M 1/32; H02P 25/02; H02P 27/06
(Continued)

(56) References Cited

U.S. PATENT DOCUMENTS

2018/0212522 A1* 7/2018 Rexha ................ G01R 31/40
2021/0288487 A1* 9/2021 Ichiki ..................... H02M 7/48

FOREIGN PATENT DOCUMENTS

JP    2013-247788 A    12/2013
JP    2016-012952 A    1/2016
(Continued)

OTHER PUBLICATIONS

International Search Report of the International Searching Authority dated Apr. 16, 2019 for the corresponding International application No. PCT/JP2019/007058 (and English translation).

*Primary Examiner* — Yemane Mehari
(74) *Attorney, Agent, or Firm* — POSZ LAW GROUP, PLC

(57) ABSTRACT

A power supply includes: a converter circuit including boost circuits, the converter circuit boosting a voltage output from a power source; a current detector that detects a first current flowing between the power source and the converter circuit; current detectors that each detect a second current, the second current being a sum current of currents flowing in switching elements of the boost circuits; and overcurrent determiners that determine whether the second currents are overcurrent on the basis of detection values of the second currents. When a result of the determination made by corresponding one of the overcurrent determiners indicates overcurrent, the boost circuits stop operating.

30 Claims, 11 Drawing Sheets

(51) Int. Cl.
*H02M 1/32* (2007.01)
*H02P 25/02* (2016.01)
*H02P 27/06* (2006.01)

(58) Field of Classification Search
USPC .......................................................... 323/271
See application file for complete search history.

(56) References Cited

FOREIGN PATENT DOCUMENTS

JP         2018-085826 A    5/2018
WO         2018/025355 A1   2/2018

* cited by examiner

POWER SUPPLY, MOTOR DRIVER, BLOWER, COMPRESSOR, AND AIR CONDITIONER

CROSS REFERENCE TO RELATED APPLICATION

This application is a U.S. national stage application of International Patent Application No. PCT/JP2019/007058 filed on Feb. 25, 2019, the disclosure of which is incorporated herein by reference.

FIELD

The present invention relates to a power supply, a motor driver, a blower, a compressor, and an air conditioner. The power supply boosts power supplied from a power source, and supplies the boosted power to a load. The motor driver includes the power supply. The blower and the compressor each includes the motor driver. The air conditioner includes the blower or the compressor.

BACKGROUND

Patent Literature 1 below discloses a power supply based on an interleaving method. The power supply includes two backflow prevention diodes, two switching elements, and two current detectors in a single converter module. A negative terminal of the converter module is connected to an AC power source via a bypass circuit outside the converter module.

CITATION LIST

Patent Literature

Patent Literature 1: Japanese Patent Application Laid-open No. 2013-247788

SUMMARY

Technical Problem

The technique of Patent Literature 1 described above adopts a configuration in which the total power supply current flows into the AC power source via the bypass circuit. Therefore, it is not necessary to provide a large-capacity terminal in the converter module, so that it is said that the power supply including the converter module can be miniaturized.

However, the current detector is provided for each of the switching elements in the configuration disclosed in Patent Literature 1. Thus, it is necessary to provide the current detectors equal in number to the switching elements. Therefore, if the number of switching elements is increased so as to increase the number of interleaved phases, the number of current detectors also increases accordingly. Thus, there arises a problem that the size of the device increases. Furthermore, there also arises a problem that an increase in the number of parts increases cost, and reduces the reliability of the device.

The present invention has been made in view of the above, and an object of the present invention is to obtain a power supply capable of detecting an overcurrent that may flow in a switching element, controlling an increase of the number of current detectors.

Solution to Problem

In order to solve the above-described problems and achieve the object, a power supply according to the present invention includes a converter circuit including an even number of boost circuits, each of the even number of boost circuits including a reactor, a switching element, and a backflow prevention diode, the converter circuit boosting a voltage output from a power source. Furthermore, the power supply includes a first-current detector that detects a first current flowing between the power source and the converter circuit; and at least one second-current detector provided for a plurality of certain boost circuits among the even number of boost circuits, the second-current detector detecting a second current, the second current being a sum current of currents flowing in the switching elements of the plurality of boost circuits. Moreover, the power supply includes at least one overcurrent determiner equivalent in number to the second-current detector, the overcurrent determiner determining whether the second current is overcurrent on the basis of a detection value of the second current. When a result of the determination made by the overcurrent determiner corresponding to the plurality of boost circuits indicates overcurrent, the plurality of boost circuits stop operating.

Advantageous Effects of Invention

The power supply according to the present invention achieves the effect of enabling detection of an overcurrent that may flow in a switching element, by controlling an increase of the number of current detectors.

DESCRIPTION OF EMBODIMENTS

Power supply, a motor driver, a blower, a compressor, and an air conditioner according to embodiments of the present invention will be described below with reference to the accompanying drawings. Note that the present invention is not limited to the following embodiments. Furthermore, electrical connection will be simply referred to as "connection" in the following description. Moreover, a module containing two elements will be described below as an example. Meanwhile, the following description is based on the assumption that the term "module" is a concept including a plurality of discrete devices or a module containing a plurality of elements.

First Embodiment

Figure 1:
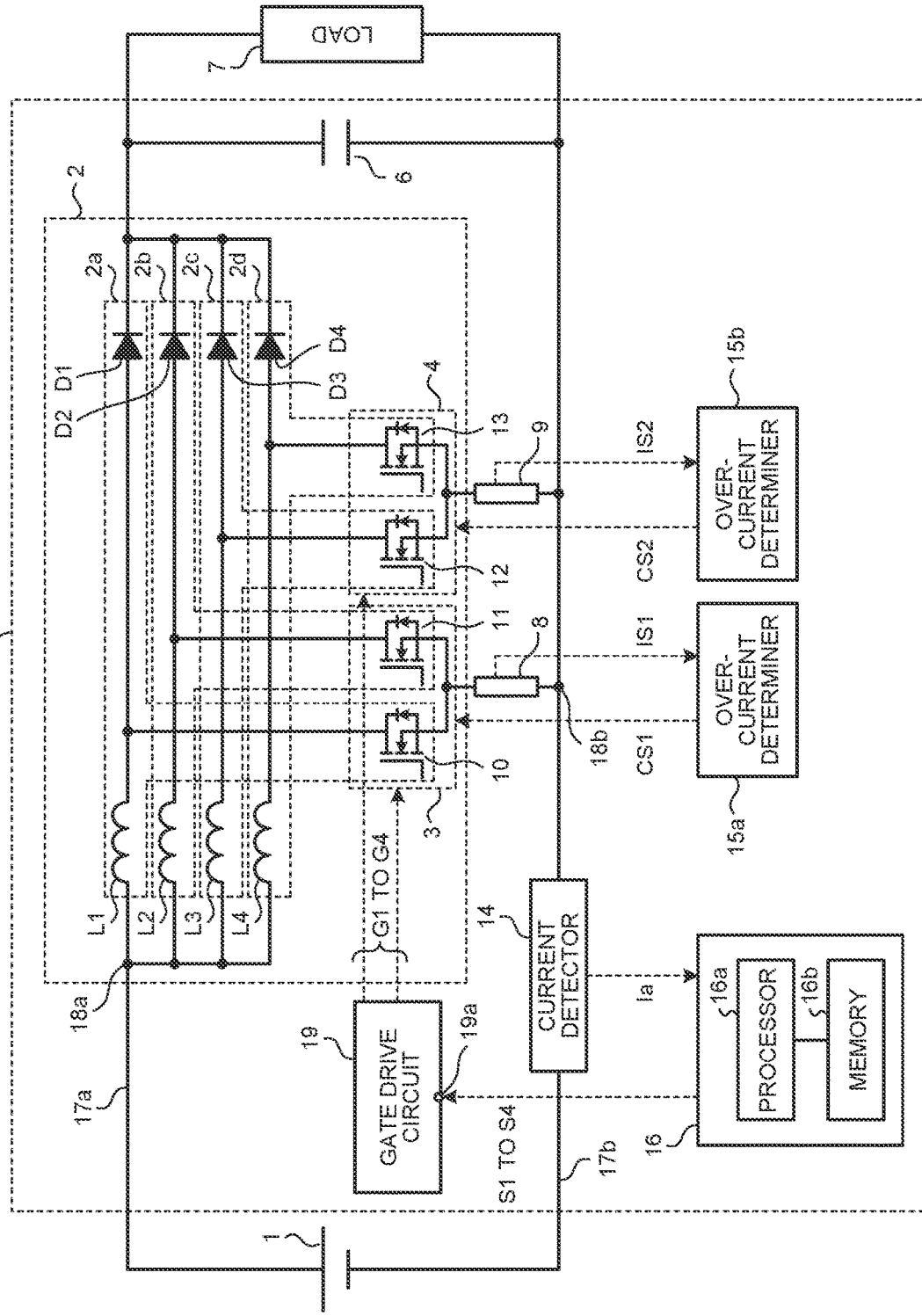
FIG. 1 is a diagram illustrating a configuration example of a power supply according to a first embodiment.

FIG. 1 is a diagram illustrating a configuration example of a power supply 100 according to a first embodiment. The power supply 100 according to the first embodiment is a power supply that boosts the voltage of DC power supplied from a power source 1, and supplies the DC power of boosted voltage to a load 7. The load 7 includes an inverter and a motor. Electric power is supplied to the inverter from the power supply 100. The motor is driven by the inverter. Note that FIG. 1 illustrates a case where the power source 1 is a DC power source, but the present invention is not limited to this example. When the power source 1 is an AC power source, the AC power just needs to be rectified by use of, for example, a diode bridge so that the rectified DC power is supplied to the power supply 100.

Next, the configuration of the power supply 100 according to the first embodiment will be described. In FIG. 1, the power supply 100 includes a converter circuit 2, a smoothing capacitor 6, a controller 16, and a gate drive circuit 19 that is a drive circuit. Furthermore, the power supply 100 includes a current detector 8, a current detector 9, and a current detector 14. Moreover, the power supply 100 includes an overcurrent determiner 15a and an overcurrent determiner 15b.

The converter circuit 2 boosts a first voltage output from the power source 1 to a second voltage. The smoothing capacitor 6 smooths the second voltage. The voltage smoothed by the smoothing capacitor 6 is applied to the load 7.

The converter circuit 2 includes boost circuits 2a to 2d. The boost circuit 2a includes a reactor L1, a backflow prevention diode D1, and a switching element 10. The boost circuit 2b includes a reactor L2, a backflow prevention diode D2, and a switching element 11. The boost circuit 2c includes a reactor L3, a backflow prevention diode D3, and a switching element 12. The boost circuit 2d includes a reactor L4, a backflow prevention diode D4, and a switching element 13. The converter circuit 2 includes the boost circuit 2a, the boost circuit 2b, the boost circuit 2c, and the boost circuit 2d, which are connected in parallel.

In the boost circuit 2a, one end of the reactor L1 is connected to the positive-side terminal of the power source 1 via a DC bus 17a, and an opposite end of the reactor L1 is connected to the anode of the backflow prevention diode D1. The DC bus 17a is one of buses that are electric wires connecting the power source 1 and the power supply 100, and is located on a higher potential side. The DC bus 17a refers to a bus extending from a connection point 18a to the power source 1, the connection point 18a being located on the one end side of the reactor L1.

Furthermore, in the boost circuit 2a, the cathode of the backflow prevention diode D1 is connected to the positive-side terminal of the smoothing capacitor 6. A connection point between the reactor L1 and the backflow prevention diode D1 is connected to one end of the switching element 10. The other boost circuits 2b, 2c, and 2d are configured in the same manner as the boost circuit 2a. Furthermore, in the boost circuits 2a to 2d, one ends of the reactors L1, L2, L3, and L4 are connected to each other at the connection point 18a, and the cathodes of the backflow prevention diodes D1, D2, D3, and D4 are also connected to each other.

In the converter circuit 2, the switching element 10 of the boost circuit 2a and the switching element 11 of the boost circuit 2b are configured as a first module 3 containing two elements. Furthermore, the switching element 12 of the boost circuit 2c and the switching element 13 of the boost circuit 2d are configured as a second module 4 containing two elements. In addition, the first module 3 may include the backflow prevention diodes D1 and D2, and the second module 4 may include the backflow prevention diodes D3 and D4.

Examples of the switching elements 10 to 13 include illustrated metal oxide semiconductor field effect transistors (hereinafter referred to as "MOSFETs"). Insulated gate bipolar transistors (IGBTs) may be used instead of MOSFETs.

Each of the switching elements 10 to 13 includes a diode connected between a drain and a source in inverse-parallel connection. The inverse-parallel connection means that the drain of an MOSFET and the cathode of a diode are connected, and the source of the MOSFET and the anode of the diode are connected. Note that a parasitic diode originally included in the MOSFET may be used as the diode described above. Parasitic diodes are also called body diodes.

Furthermore, at least one of the switching elements 10 to 13 is not limited to a MOSFET formed of a silicon-based material, and may be a MOSFET formed of a wide bandgap semiconductor such as a silicon carbide, a gallium nitride-based material, or diamond.

In general, wide bandgap semiconductors are higher in voltage resistance and heat resistance than silicon semiconductors. Therefore, use of a wide bandgap semiconductor for at least one of the switching elements 10 to 13 will increase the voltage resistance and allowable current density of the switching element, so that a semiconductor module incorporating the switching element can be miniaturized.

The current detector 8 for overcurrent detection is connected in series with the first module 3. Furthermore, the current detector 9 for overcurrent detection is connected in series with the second module 4. One end of the current detector 8 is connected to a connection point between the sources of the switching elements 10 and 11, and an opposite end is connected to a DC bus 17b. In addition, one end of the current detector 9 is connected to a connection point between the sources of the switching elements 12 and 13, and an opposite end is connected to the DC bus 17b. The DC bus 17b is one of the buses that are the electric wires connecting the power source 1 and the power supply 100, and is located on a lower potential side. The DC bus 17b refers to a bus extending from a connection point 18b to the power source 1, the connection point 18b being located on the opposite end side of the current detector 8.

The current detector 14 is placed on the DC bus 17b. The current detector 14 detects a direct current flowing between the negative-side terminal of the power source 1 and the connection point 18b. Note that although the current detector 14 is placed on the DC bus 17b in FIG. 1, the current detector 14 may be placed on the DC bus 17a. In this case, the current detector 14 detects a direct current flowing between the connection point 18a and the positive-side terminal of the power source 1.

When the boost circuit 2a or the boost circuit 2b operates, a current flows in the current detector 8 through the first module 3. Furthermore, when the boost circuit 2c or the boost circuit 2d operates, a current flows in the current detector 9 through the second module 4. In addition, when at least one of the boost circuits 2a to 2d operates, a current flows in the current detector 14. Note that in the following description, the current flowing in the current detector 14 may be referred to as a "power supply current", "first current", or "total current". Moreover, each of the currents flowing in the current detectors 8 and 9 may be referred to as a "second current". Furthermore, the current detector 14 may be referred to as a "first-current detector", and each of the current detectors 8 and 9 may be referred to as a "second-current detector". In addition, the current detector 8 may be referred to as a "first detector of the second current", and the current detector 9 may be referred to as a "second detector of the second current".

The current detector 14 detects the first current flowing through the current detector 14. The current detector 8 detects the second current flowing through the current detector 8. The second current flowing through the current detector 8 is a sum current obtained by addition of a current flowing through the switching element 10 and a current flowing through the switching element 11. The current detector 9 detects the second current flowing through the current detector 9. The second current flowing through the current detector 9 is a sum current obtained by addition of a current flowing through the switching element 12 and a current flowing through the switching element 13. The overcurrent determiner 15a determines whether the second current flowing through the current detector 8 is overcurrent. The overcurrent determiner 15b determines whether the second current flowing through the current detector 9 is overcurrent.

The controller 16 includes a processor 16a and a memory 16b. The controller 16 receives a detection value Ia of the first current from the current detector 14. The controller 16 generates control signals S1 to S4 for controlling the switching elements of the first module 3 and the second module 4, on the basis of the detection value Ia. The control signal S1 is a control signal for controlling the switching element 10. Similarly, the control signal S2 is a control signal for controlling the switching element 11, the control signal S3 is a control signal for controlling the switching element 12, and the control signal S4 is a control signal for controlling the switching element 13. The control signals S1 to S4 generated by the controller 16 are input to an input port 19a of the gate drive circuit 19. The controller 16 serves a function of controlling the first module 3 and the second module 4, and is not only for performing overcurrent interruption.

The processor 16a in the controller 16 is an arithmetic means such as an arithmetic unit, a microprocessor, a microcomputer, a central processing unit (CPU), or a digital signal processor (DSP). The memory 16b is a nonvolatile or volatile semiconductor memory such as a random access memory (RAM), a read only memory (ROM), a flash memory, an erasable programmable ROM (EPROM), or an electrically EPROM (EEPROM) (registered trademark).

In the memory 16b, there are stored programs that implement the above-described functions of the controller 16 and the functions of the controller 16 to be described below. The processor 16a sends and receives necessary information through an interface including an analog-to-digital converter and a digital-to-analog converter (not illustrated), and executes the programs stored in the memory 16b to perform required processing. The result of operation performed by the processor 16a is stored in the memory 16b.

The gate drive circuit 19 generates drive pulses G1 to G4 for driving the switching elements of the first module 3 and the second module 4, on the basis of the control signals S1 to S4. The drive pulse G1 is a drive pulse for driving the switching element 10. Similarly, the drive pulse G2 is a drive pulse for driving the switching element 11, the drive pulse G3 is a drive pulse for driving the switching element 12, and the drive pulse G4 is a drive pulse for driving the switching element 13.

When any of the switching elements of the first module 3 and the second module 4 is controlled and performs switching operation, DC power supplied from the power source 1 is accumulated in a corresponding reactor. The controller 16 performs switching control for causing each switching element to perform switching operation with a predetermined duty ratio so that a desired boost voltage is output as the second voltage from the converter circuit 2. The converter circuit 2 transmits required electric power to the load 7 by applying the boosted second voltage to the smoothing capacitor 6 and the load 7.

In the converter circuit 2, the boost circuits 2a to 2d operate in turn according to a predetermined cycle. This cycle is called an "interleave cycle". In addition, a combination of one reactor and one switching element is counted as one phase. The number of boost circuits defined in the first embodiment matches the number of phases defined here. FIG. 1 illustrates an example of four phases, which is a configuration based on a four-phase interleaving method. However, the present embodiment is not limited to this configuration. When N denotes an integer equal to or greater than 1, the number of phases just needs to be 2N. That is, the power supply 100 according to the first embodiment just needs to adopt a configuration of an even-numbered phase (two-phase, four-phase, six-phase, eight-phase, . . . ) interleaving method. Note that in the case of a two-phase interleaving method, there are provided a single module and a current detector connected to the single module.

Furthermore, FIG. 1 illustrates the configuration of the four-phase interleaving method in which two switching elements are included in a single module. However, the present embodiment is not limited to this configuration. For example, in the case of a six-phase interleaving method, two modules may be provided which each include three switching elements.

Figure 2:
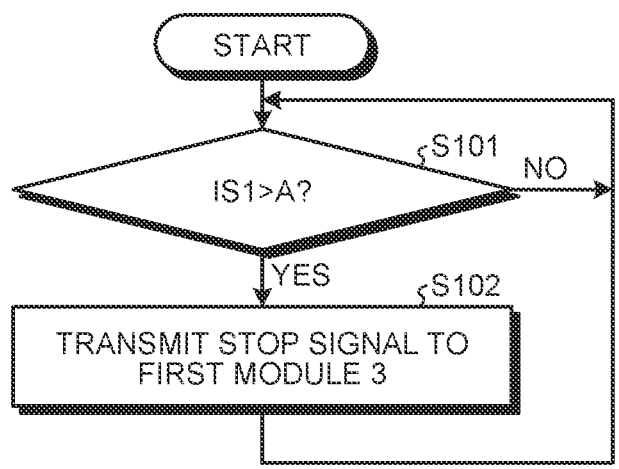
FIG. 2 is a flowchart to be used for describing the operation of an overcurrent determiner in the first embodiment.

Next, operation of a main part of the power supply 100 according to the first embodiment will be described with reference to FIGS. 1 and 2. FIG. 2 is a flowchart to be used for describing the operation of the overcurrent determiner in the first embodiment. Note that FIG. 2 is a flowchart associated with the operation of the overcurrent determiner 15a.

The overcurrent determiner 15a determines whether the second current is overcurrent on the basis of a detection value IS1 of the second current detected by the current detector 8 (step S101). A threshold value A, which is a first threshold value, is used for determining overcurrent. When the detection value IS1 of the second current is equal to or less than the threshold value A (step S101, No), the overcurrent determiner 15a determines that the second current is not overcurrent, and continues the determination process of step S101. Meanwhile, when the detection value IS1 of the second current is greater than the threshold value A (step S101, Yes), the overcurrent determiner 15a determines that the second current is overcurrent, and transmits a stop signal CS1 to the first module 3 (step S102). As a result of this process, the switching elements 10 and 11 of the first module 3 stop operating. After that, the process returns to step S101, and the determination process is continued from step S101.

Note that the overcurrent determiner 15*a* determines in the determination process of step S101 that "the second current is not overcurrent" when the detection value IS1 of the second current is equal to the threshold value A, but the overcurrent determiner 15*a* may determine that "the second current is overcurrent".

Operation of the overcurrent determiner 15*b* will be described in the same manner. The overcurrent determiner 15*b* determines whether the second current is overcurrent on the basis of a detection value IS2 of the second current detected by the current detector 9. The threshold value A is used for determining overcurrent, as in the overcurrent determiner 15*a*. When the detection value IS2 of the second current is equal to or less than the threshold value A, the overcurrent determiner 15*b* determines that the second current is not overcurrent. Meanwhile, when the detection value IS2 of the second current is greater than the threshold value A, the overcurrent determiner 15*b* determines that the second current is overcurrent, and transmits a stop signal CS2 to the second module 4. As a result of this process, the switching elements 12 and 13 of the second module 4 stop operating. Note that in the present determination process, the overcurrent determiner 15*b* determines that "the second current is not overcurrent" when the detection value IS2 of the second current is equal to the threshold value A, but the overcurrent determiner 15*b* may determine that "the second current is overcurrent".

An integrated circuit (IC) can be used to configure the overcurrent determiners 15*a* and 15*b*. Note that the overcurrent determiner 15*a* has the function of forcibly stopping the operation of the first module 3 when an overcurrent flows through the current detector 8, but does not have the function of directly controlling the switching elements 10 and 11 of the first module 3. Furthermore, the overcurrent determiner 15*b* has the function of forcibly stopping the operation of the second module 4 when an overcurrent flows through the current detector 9, but does not have the function of directly controlling the switching elements 12 and 13 of the second module 4. Note that any method may be used to stop the operation of the first module 3 and the second module 4. Electric supply to the switching elements may be forcibly cut off, or control signal lines to the switching elements may be electrically cut off by switches or the like.

Next, operation of the controller 16 will be described. The controller 16 determines whether the first current is overcurrent on the basis of the detection value Ia of the first current received from the current detector 14. A threshold value B, which is a second threshold value, is used for determining overcurrent. When the detection value Ia of the first current is equal to or less than the threshold value B, the controller 16 determines that the first current is not overcurrent, and performs normal control. Meanwhile, when the detection value Ia of the first current is greater than the threshold value B, the controller 16 determines that the first current is overcurrent, and transmits a stop signal to the gate drive circuit 19 to stop output of the drive pulses G1 to G4 for driving the switching elements. As a result, the first module 3 and the second module 4 stop operating. Note that in the present determination process, it is determined that "the first current is not overcurrent" when the detection value Ia of the first current is equal to the threshold value B, but it may be determined that "the first current is overcurrent". Furthermore, any method may be used for transmitting the stop signals to the gate drive circuit 19. The gate drive circuit 19 may be caused to recognize the control signals S1 to S4 as stop signals according to signal levels of the control signals S1 to S4 for the gate drive circuit 19. Alternatively, signals different from the control signals S1 to S4 may be output to the gate drive circuit 19 so as to forcibly stop the output of the drive pulses G1 to G4.

As a result of the above control, when the result of determination made by the overcurrent determiner 15*a* indicates overcurrent, the switching elements 10 and 11 of the first module 3 stop switching operation, and when the result of determination made by the overcurrent determiner 15*b* indicates overcurrent, the switching elements 12 and 13 of the second module 4 stop switching operation. Then, when the result of determination made by the controller 16 indicates overcurrent, all the switching elements 10 to 13 stop switching operation.

Stop control using the overcurrent determiner 15*a* or the overcurrent determiner 15*b* (hereinafter, referred to as "first stop control" as appropriate) is performed only when an overcurrent is flowing. Furthermore, the first stop control is performed prior to stop control (hereinafter, referred to as "second stop control" as appropriate) to be performed by the controller 16 on the basis of the detection value Ia of the first current detected by the current detector 14. Meanwhile, the second stop control is continuously performed when an overcurrent is detected even once. Therefore, if the first stop control and the second stop control are performed in parallel, it is possible to surely prevent a failure of the switching element from being magnified.

As described above, of the current detectors 8, 9 and 14, the current detectors 8 and 9 are used only for detecting and cutting off an overcurrent. Therefore, the current detectors 8 and 9 may be lower in cost and accuracy than the current detector 14. Meanwhile, when an anomaly occurs, it is necessary to immediately perform the first stop control described above. Therefore, the response speeds of the current detectors 8 and 9 should be higher than that of the current detector 14. A shunt resistor can be cited as an example of the current detectors 8 and 9.

The overcurrent determiners 15*a* and 15*b* transmit stop signals to the first module 3 and the second module 4 without involving the controller 16 and the gate drive circuit 19. Therefore, operation of a module can be stopped quickly when it is determined that an overcurrent is flowing through the module.

Furthermore, the current detector 14 is provided for controlling the switching elements 10 to 13 and detecting a total current flowing through the switching elements 10 to 13. That is, the controller 16 controls each of the switching elements 10 to 13 by using the detection value Ia of the first current detected by the current detector 14. The first current flowing through the current detector 14 is a sum current that is the sum of the second current flowing through the current detector 8 and the second current flowing through the current detector 9. Thus, the first current is lower in frequency than the second current. Therefore, the response speed of the current detector 14 may be lower than the response speed of the current detector 8 or the current detector 9. Meanwhile, since the current detector 14 controls the switching elements 10 to 13, it is desirable for the current detector 14 to be higher in accuracy than the current detector 8 or the current detector 9. A current transformer (CT) can be cited as an example of the current detector 14.

As described above, the power supply according to the first embodiment includes the one or more second current detectors and the overcurrent determiners. Each of the one or more second current detectors is provided for a plurality of the certain boost circuits, and detects the second current that is a sum current of currents flowing in the switching elements of the plurality of boost circuits. The overcurrent determiners are equivalent in number to the second-current detectors. Each of the overcurrent determiners determines whether the second current is overcurrent on the basis of a detection value of the second current. Then, when a result of the determination made by the overcurrent determiner provided in association with the plurality of boost circuits indicates overcurrent, the plurality of boost circuits stops operating. As a result, it is possible to achieve detection of an overcurrent that may flow in the switching elements, controlling an increase of the number of current detectors. In addition, since it is possible to control an increase in the number of current detectors, cost can be reduced. Moreover, since a mounting area can be reduced, the power supply can be miniaturized.

Figure 3:
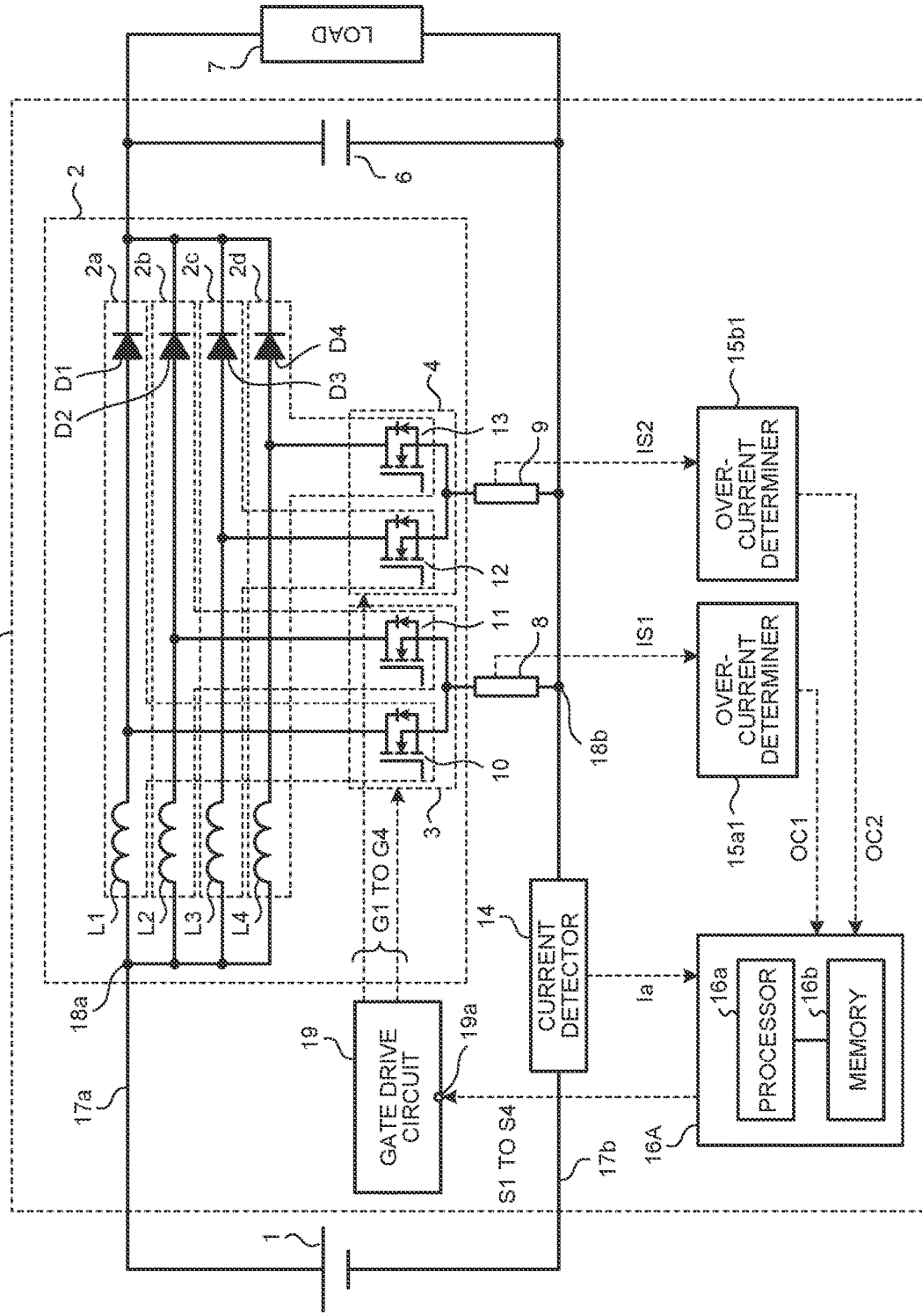
FIG. 3 is a diagram illustrating a first modification of the power supply according to the first embodiment.

Note that FIG. 1 illustrates a configuration in which the first stop control is performed by the overcurrent determiners 15a and 15b, but the present embodiment is not limited to this configuration. Specifically, it is possible to adopt a configuration as illustrated in FIG. 3, instead of the configuration of FIG. 1. FIG. 3 is a diagram illustrating a first modification of the power supply according to the first embodiment.

FIG. 3 illustrates a power supply 100A according to the first modification of the first embodiment, obtained by replacement of the overcurrent determiners 15a and 15b with overcurrent determiners 15a1 and 15b1, respectively, and replacement of the controller 16 with a controller 16A, in the configuration of the power supply 100 illustrated in FIG. 1. Except for these points, the configuration of the first modification is the same as or equivalent to the configuration illustrated in FIG. 1. Thus, the same or equivalent constituent parts are designated by the same reference numerals, and duplicate description will be omitted.

In FIG. 3, when the detection value IS1 of the second current detected by the current detector 8 is greater than the threshold value A, the overcurrent determiner 15a1 determines that the second current is overcurrent, and outputs, to the controller 16A, a determination result OC1 to the effect that the second current is overcurrent. Furthermore, when the detection value IS2 of the second current detected by the current detector 9 is greater than the threshold value A, the overcurrent determiner 15b1 determines that the second current is overcurrent, and outputs, to the controller 16A, a determination result OC2 to the effect that the second current is overcurrent. The controller 16A transmits stop signals to the gate drive circuit 19 on the basis of the determination results OC1 and OC2. Thereafter, operation is performed as described above.

According to the configuration of FIG. 3, in the overcurrent determiner 15a1 the stop signal CS1 can be changed to the determination result OC1. Furthermore, in the overcurrent determiner 15b1 the stop signal CS2 can be changed to the determination result OC2. The determination results OC1 and OC2 are communicated between a processor and an IC. This achieves the effect of enabling communication to be easily established. Note that when adopting the configuration of FIG. 3, it is desirable to use the processor 16a higher in processing capacity and use the gate drive circuit 19 higher in processing speed than those illustrated in FIG. 1.

Figure 4:
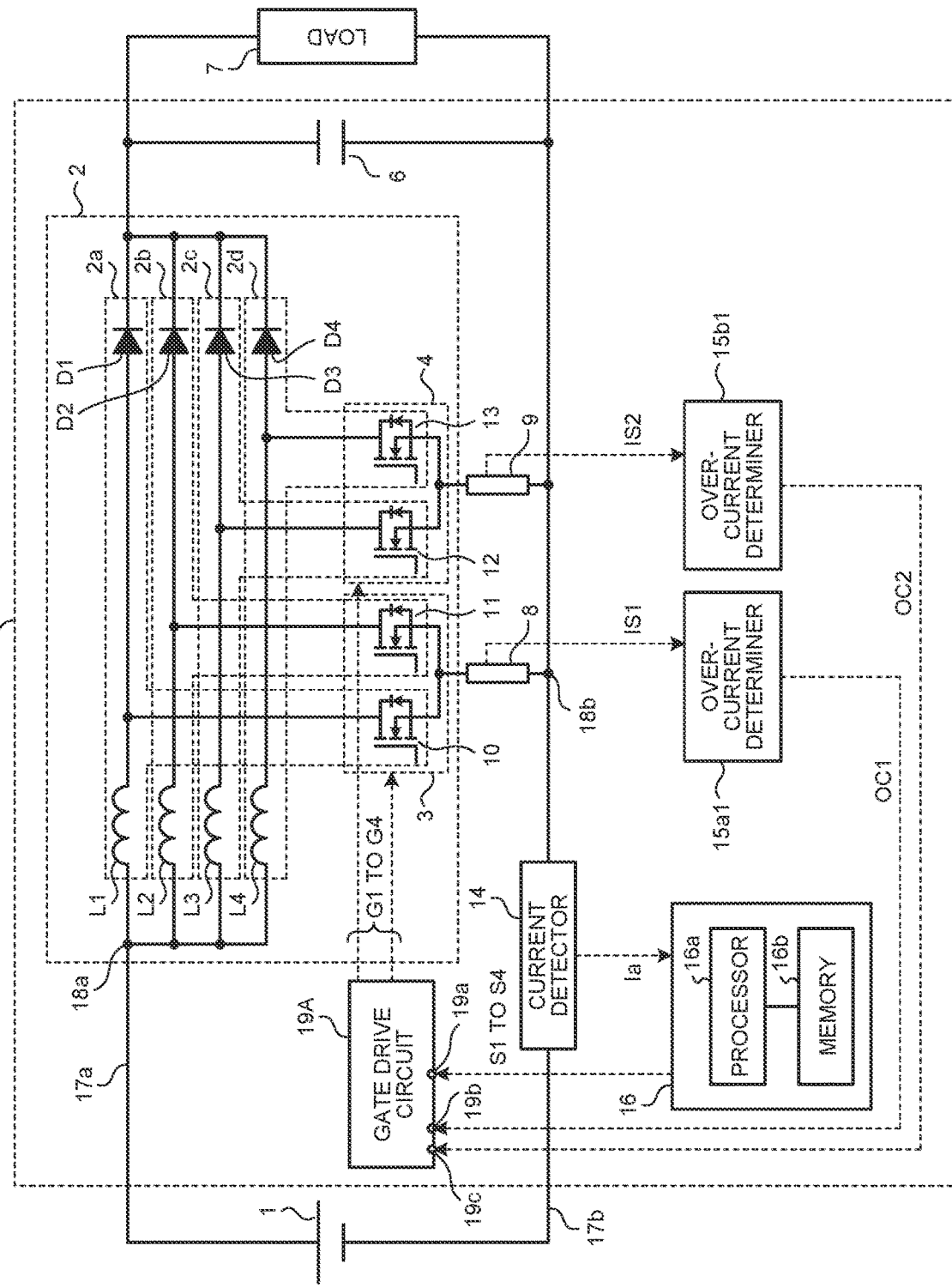
FIG. 4 is a diagram illustrating a second modification of the power supply according to the first embodiment.

Furthermore, it is possible to adopt a configuration as illustrated in FIG. 4, instead of the configuration of FIG. 1. FIG. 4 is a diagram illustrating a second modification of the power supply according to the first embodiment.

FIG. 4 illustrates a power supply 100B according to the second modification of the first embodiment, obtained by replacement of the overcurrent determiners 15a and 15b with the overcurrent determiners 15a1 and 15b1, respectively, and replacement of the gate drive circuit 19 with a gate drive circuit 19A, in the configuration of the power supply 100 illustrated in FIG. 1. Furthermore, the gate drive circuit 19A is provided with input ports 19b and 19c. Except for these points, the configuration of the first modification is the same as or equivalent to the configuration illustrated in FIG. 1. Thus, the same or equivalent constituent parts are designated by the same reference numerals, and duplicate description will be omitted.

In FIG. 4, when the detection value IS1 of the second current detected by the current detector 8 is greater than the threshold value A, the overcurrent determiner 15a1 determines that the second current is overcurrent, and outputs, to the input port 19b of the gate drive circuit 19A, the determination result OC1 to the effect that the second current is overcurrent. Furthermore, when the detection value IS2 of the second current detected by the current detector 9 is greater than the threshold value A, the overcurrent determiner 15b1 determines that the second current is overcurrent, and outputs, to the input port 19c of the gate drive circuit 19A, the determination result OC2 to the effect that the second current is overcurrent. The gate drive circuit 19A performs the first stop control for the switching elements 10 and 11 of the first module 3 on the basis of the determination result OC1, and performs the first stop control for the switching elements 12 and 13 of the second module 4 on the basis of the determination result OC2. Thereafter, operation is performed as described above.

According to the configuration of FIG. 4, in the overcurrent determiner 15a1 the stop signal CS1 can be changed to the determination result OC1. Furthermore, in the overcurrent determiner 15b1 the stop signal CS2 can be changed to the determination result OC2. The determination results OC1 and OC2 are communicated between circuits. This achieves the effect of enabling communication to be easily established. Note that when adopting the configuration of FIG. 4, it is desirable to use the gate drive circuit 19 higher in processing speed than that illustrated in FIG. 1. In addition, the processor 16a may be lower in processing capacity than that in the configuration of FIG. 3.

Second Embodiment

Figure 5:
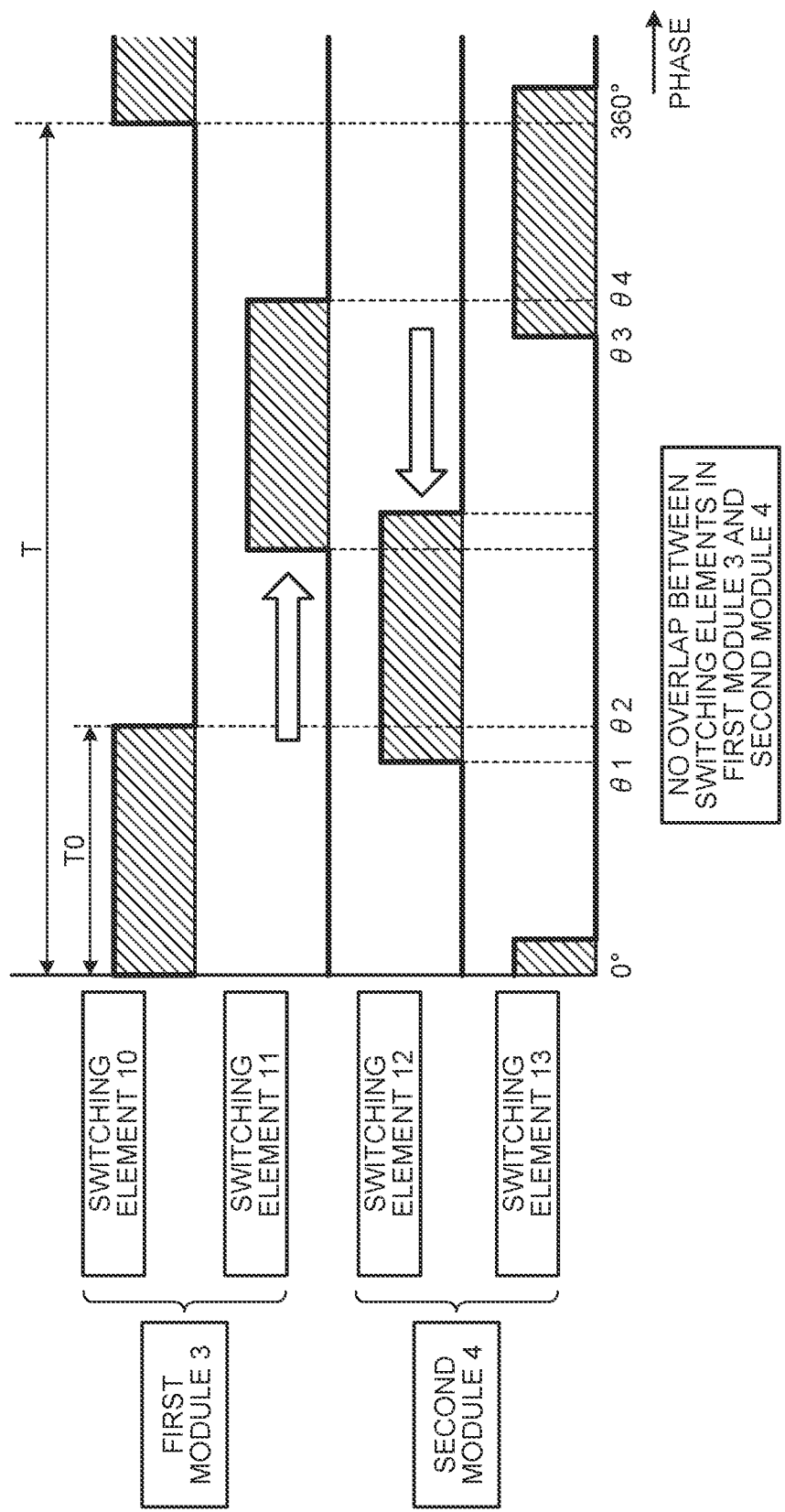
FIG. 5 is a diagram illustrating examples of switching patterns in a second embodiment.
Figure 6:
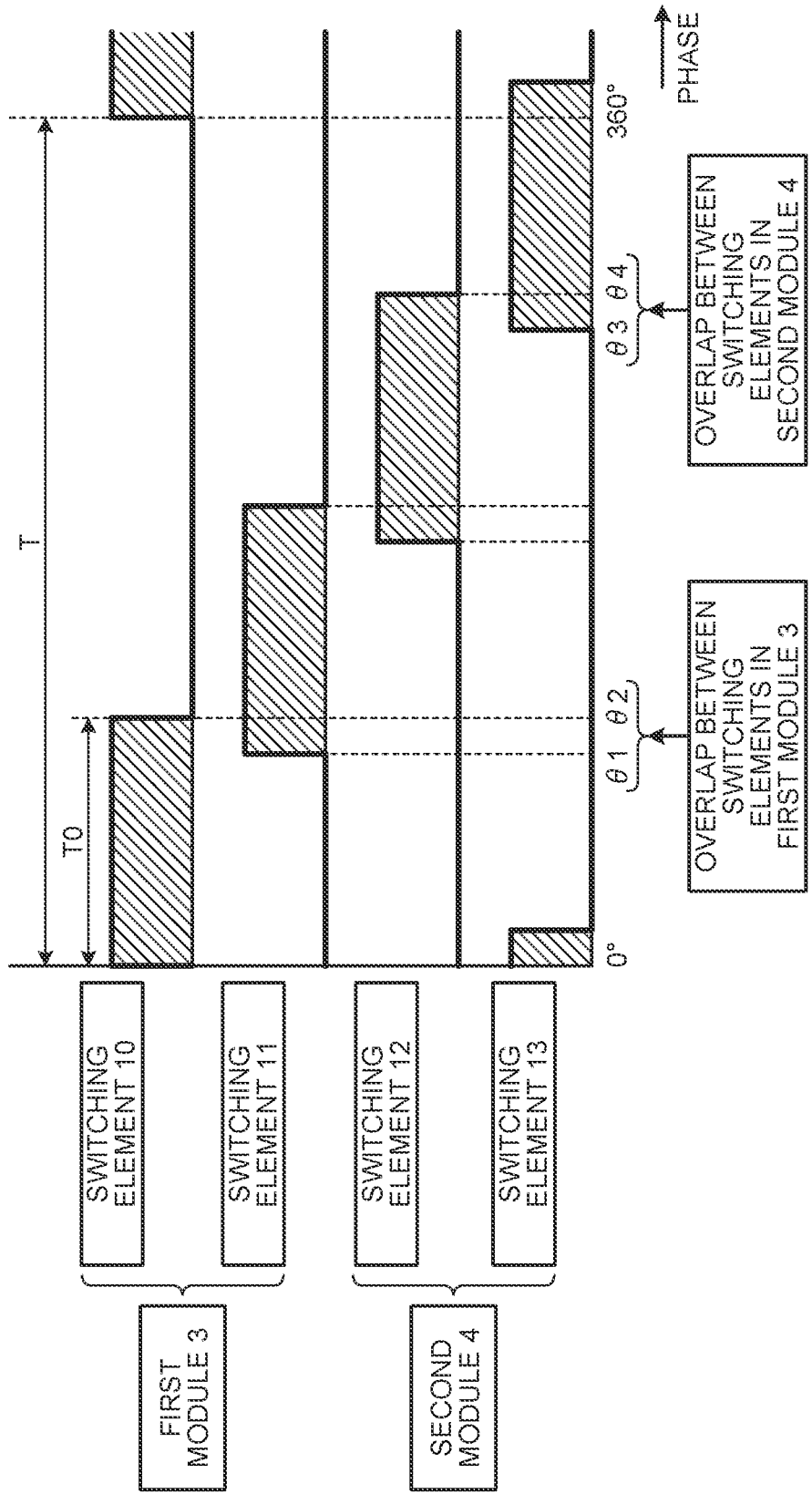
FIG. 6 is a diagram illustrating switching patterns as comparative examples in comparison with the switching patterns of the second embodiment illustrated in FIG. 5.
Figure 7:
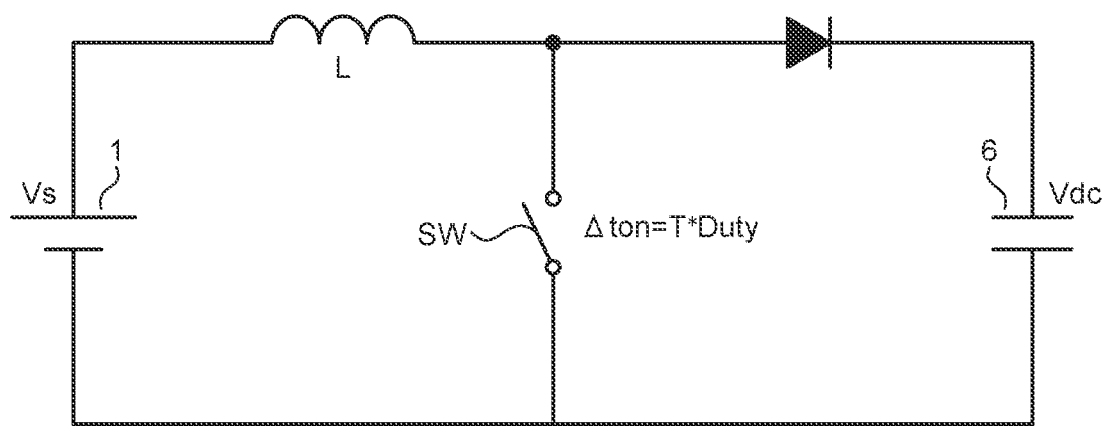
FIG. 7 is a diagram illustrating an equivalent circuit of a power supply, to be used for describing the operation of the second embodiment.
Figure 8:
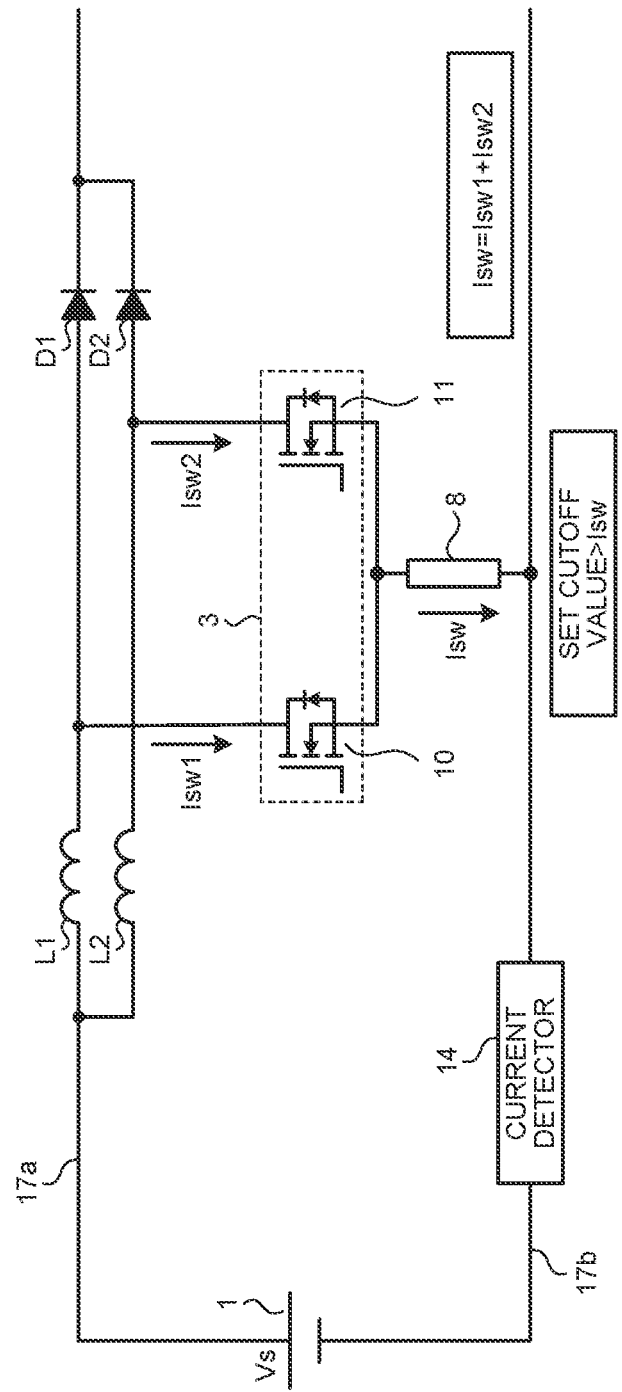
FIG. 8 is a diagram illustrating a simplified circuit of the power supply, to be used for describing the operation of the second embodiment.

Switching patterns for driving the switching elements 10 to 13 and operation and effects based on the switching patterns will be described in a second embodiment with reference to the drawings of FIGS. 5 to 8. FIG. 5 is a diagram illustrating examples of switching patterns in the second embodiment. FIG. 6 is a diagram illustrating switching patterns as comparative examples in comparison with the switching patterns of the second embodiment illustrated in FIG. 5. FIG. 7 is a diagram illustrating an equivalent circuit of a power supply, to be used for describing the operation of the second embodiment. FIG. 8 is a diagram illustrating a simplified circuit of the power supply, to be used for describing the operation of the second embodiment. Note that the basic configuration of the power supply according to the second embodiment is the same as that of the first embodiment, and description of the configuration will be omitted.

First, the switching patterns illustrated as comparative examples in FIG. 6 will be described. In FIG. 6, the switching patterns of the switching elements 10 to 13 are illustrated in the order of the switching element 10, the switching element 11, the switching element 12, and the switching element 13 from the upper side. Hatched areas indicate on-periods. The horizontal axis indicates a phase. The symbol "T" denotes the control cycle of switching, and one cycle of the control cycle T is represented as 360 degrees. The control cycle T is a cycle period for switching control of each switching element.

In the example of FIG. 6, first, the switching element 10 in the first module 3 is controlled to be turned on. After that, the switching element 11 in the first module 3, the switching element 12 in the second module 4, and the switching element 13 in the second module 4 are controlled to be turned on in this order. Here, TO denotes the on-period in which each switching element is controlled to be in an on-state. Then, the value of "TO/T", that is, the on-period TO divided by the control cycle T is defined as duty ratio.

Furthermore, in a 2N-phase interleaving method, where N is an integer equal to or greater than 1, a phase angle difference that causes no overlap between the respective on-periods of the switching elements is generalized as 360/(2N) [degrees]. Here, 360 [degrees] is the phase angle of one control cycle with respect to 0 [degrees], and "2N" is the number of phases. Specifically, in the case of the four-phase interleaving method, the phase angle difference that causes no overlap between the respective on-periods of the switching elements is 90 degrees, and the duty ratio is 25% at that time.

FIG. 6 illustrates an example in which the duty ratio of switching control exceeds 25% of the control cycle T. In this case, a phenomenon occurs in which the switching elements in the same module are simultaneously in the on-state. Specifically, in the example of FIG. 6, the switching element 10 and the switching element 11 of the first module 3 are simultaneously in the on-state in a section between phases θ1 and θ2. Furthermore, the switching element 12 and the switching element 13 of the second module 4 are simultaneously in the on-state in a section between phases θ3 and θ4.

When the switching elements in each module are simultaneously in the on-state, a sum current of the entire module flows to each current detector in each module. There is no problem if the switching elements are simultaneously in the on-state in the vicinity of a zero cross point. However, if the switching elements are simultaneously in the on-state on in the vicinity of a current peak, there is a possibility that a cutoff value set in the device (hereinafter referred to as a "set cutoff value") may be exceeded. In this case, exceeding the set cutoff value leads not to a failure anomaly, but to an overcurrent error during normal operation, so that there is a concern that stability during normal operation may be reduced.

Next, a boost ratio that enables the duty ratio of switching control to be controlled such that the duty ratio is equal to or less than 25% of the control cycle will be described with reference to FIG. 7. FIG. 7 illustrates, in a simplified manner, one of the boost circuits in the power supply 100 illustrated in FIG. 1. In FIG. 7, Vs denotes the output voltage of the power source 1 (the above-described "first voltage"), and Vdc denotes the boosted voltage held by the smoothing capacitor 6 (the above-described "second voltage"). Furthermore, SW denotes one of the switching elements 10 to 13. In addition, L denotes the inductance of the reactor, Aton denotes the on-time of the switching element SW, T denotes the control cycle described above, and Duty denotes a value of the duty ratio expressed as a percentage (%).

First, an on-current ΔIon that flows during a period in which the switching element SW is in the on-state can be calculated from a relational expression shown below.

$$Vs = L * \Delta Ion / \Delta ton$$

$$\Delta Ion = Vs * \Delta ton / L \quad (1)$$

The on-current ΔIon in expression (1) above is a current flowing through the reactor during the period in which the switching element SW is in the on-state.

Furthermore, an off-current ΔIoff that flows during a period in which the switching element SW is in an off-state can be calculated from a relational expression shown below.

$$Vdc = L * \Delta Ioff / (T - \Delta ton) + Vs$$

$$\Delta Ioff = (Vdc - Vs) * (T - \Delta ton) / L \quad (2)$$

The off-current ΔIoff in expression (2) above is a current flowing through the diode during the period in which the switching element SW is in the off-state.

Here, if ΔIon=ΔIoff, voltage can be boosted. This relationship can be expressed as follows.

$$Vs * \Delta ton / L = (Vdc - Vs) * (T - \Delta ton) / L$$

$$Vs = Vdc * (T - \Delta ton) / T \quad (3)$$

Here, since the relationship of Δton=T*Duty holds, the second equation of expression (3) above can be expressed by expression (4) below.

$$Vs = Vdc * (1 - Duty) \quad (4)$$

Substituting Duty=25% into expression (4) above gives expression (5) below.

$$Vs = Vdc * (1 - 0.25) = 0.75 Vdc$$

$$Vdc = (1 / 0.75) * Vs = 1.3 Vdc \quad (5)$$

Therefore, it can be seen from the second equation of expression (5) above that a boost ratio of 1.3 or less enables "Duty" to be controlled such that "Duty" is equal to or less than 25% in the case of the switching patterns illustrated in FIG. 6. That is, in order to achieve a boost ratio of 1.3 or more in the case of the switching patterns illustrated in FIG. 6, it is necessary to set "Duty" to a value equal to or greater than 25%. This means that it is not possible to avoid causing the switching elements in the same module to be simultaneously in the on-state.

Therefore, the switching patterns are changed as illustrated in FIG. 5. In FIG. 5, first, the switching element 10 in the first module 3 is controlled to be turned on. Next, the switching element 12 in the second module 4 is controlled to be turned on. After that, the switching element 11 in the first module 3 and the switching element 13 in the second module 4 are controlled to be turned on in this order.

As a result of the switching control performed as described above, the switching elements in the same module are not simultaneously in the on-state until "Duty" reaches 50%. At this time, a receiving voltage that enables Duty to be controlled to satisfy Duty=50% is expressed by expression (6) below.

$$Vs = Vdc * (1 - 0.5) = 0.5 Vdc$$

$$Vdc = (1 / 0.5) * Vs = 2 Vs \quad (6)$$

The second equation of expression (6) above shows that control can be performed when the boost ratio is equal to or less than 2. This means that a boost ratio exceeding 1.3 but not exceeding 2 make it possible to avoid causing the switching elements in the same module to be simultaneously in the on-state in the case of the switching patterns of the method proposed in the second embodiment. As a result, in the case of the switching patterns of the method proposed in the second embodiment, it is possible to reduce a possibility that an overcurrent error may occur during normal operation.

As described above, a phase angle difference in the switching patterns of FIG. 6 is determined on the basis of the number of phases. In contrast, in the switching patterns of the second embodiment illustrated in FIG. 5, the number of switching elements determines a phase angle difference between the switching elements when the switching elements in the same module are controlled to be turned on. Here, let K be the number of switching elements in the same module, where K is an integer equal to or greater than 2. At this time, when the switching elements in the same module are controlled to be turned on in the switching patterns of FIG. 5, the phase angle difference between the switching elements can be generalized as a value obtained as a result of dividing a phase angle of 360 degrees of one control cycle by the number of switching elements in the same module. In the case of the configuration illustrated in FIG. 1, the number of switching elements in each module is "two", and the phase angle difference is 360/2=180 degrees. Note that as will be described below, the number of switching elements in the same module may be three or more. For example, when the number of switching elements in the same module is three, the phase angle difference is 360/3=120 degrees.

Furthermore, in the switching patterns of the second embodiment illustrated in FIG. 5, a phase angle difference in switching control between modules is different from a phase angle difference in switching control in a module. Specifically, a phase angle difference in switching control between the switching element 10 of the first module 3 and the switching element 12 of the second module 4 is 360/4=90 degrees in the case of the example of FIG. 5. Here, a phase angle difference between switching elements is defined as a "phase angle difference in switching control between adjacent modules" when a switching element serving as a benchmark in each module (the switching element 10 and the switching element 12, or the switching element 11 and the switching element 13 in the configuration of FIG. 1) is controlled to be turned on. Using this definition, the phase angle difference in switching control between modules can be generalized as a value obtained as a result of dividing a phase angle of 360 degrees of one control cycle by the number of interleaved phases "2N". For example, when the number of interleaved phases is eight, the conceivable number of switching elements in the same module is two (in this case, the number of modules=4) or four (in this case, the number of modules=2). In either case, the phase angle difference in switching control between the modules is 360/8=45 degrees.

Next, a further effect to be obtained by the switching patterns in the second embodiment will be described. FIG. 8 illustrates, in a simplified manner, the boost circuits in the power supply 100 illustrated in FIG. 1. Specifically, only the switching elements 10 and 11 of the first module 3 are illustrated. Therefore, operation in the two-phase interleaving method will be described here.

In FIG. 8, the symbol "Isw1" denotes a current that flows when the switching element 10 is turned on, the symbol "Isw2" denotes a current that flows when the switching element 11 is turned on, and the symbol "Isw" denotes a current that flows through the current detector 8. The following relationship holds between the current Isw1, the current Isw2, and the current Isw:

$Isw=Isw1+Isw2.$

First, assume that the current Isw1 with an effective value of X [Arms] flows when the switching element 10 is turned on in FIG. 8. The abbreviation "rms" stands for root mean square. Furthermore, assume that the switching element 11 has the same characteristics as the switching element 10, and that the current Isw2 with the same effective value, that is, an effective value of X [Arms] flows when the switching element 11 is turned on. Therefore, the set cutoff value of the current detector 8 should be set to a value equal to or greater than X [Arms]. Meanwhile, the simultaneous turning on of the switching elements 10 and 11 is not taken into consideration in setting this value. If the switching elements 10 and 11 are simultaneously turned on, a current of X [Arms] flows through each of the switching elements 10 and 11, so that a current of 2X [Arms] flows in the entire first module 3. Therefore, considering the simultaneous turning on of the switching elements 10 and 11, the set cutoff value of the current detector 8 should be set to a value equal to or greater than 2X [Arms]. Similarly, since a current of 2X [Arms] also flows through the current detector 14, a rated value should also be set to a value equal to or greater than 2X [Arms].

As described above, considering the simultaneous turning on of the switching elements in the same module, it is necessary to raise the current capacity of the elements in the entire circuit. This leads to a problem of increasing the cost and size of the device.

In contrast, according to the switching patterns proposed in the second embodiment, it is possible to reduce current flowing in the same module. As a result, it is possible to reduce the current capacity of the elements in the entire circuit, and thus, reduction in cost and size can be achieved.

Furthermore, in the switching patterns of FIG. 6, when the boost ratio exceeds 1.3 and "Duty" exceeds 25%, the simultaneous turning on of the switching elements in the same module occurs. As a result, an overcurrent error may occur during normal operation when "Duty" is 1−0.25=75%. In contrast, according to the switching patterns proposed in the second embodiment, the simultaneous turning on of the switching elements in the same module does not occur until the boost ratio reaches 2 and "Duty" reaches 50%. As a result, an overcurrent error may occur during normal operation when "Duty" is 1−0.5=50%. Therefore, according to the switching patterns proposed in the second embodiment, the range of duty ratio that may cause an overcurrent error can be reduced as compared with the conventional technique.

Furthermore, when the simultaneous turning on of the switching elements in the same module does not occur, a current flowing in the same module is relatively smaller than in the case where the simultaneous turning on of the switching elements occurs, so that generation of heat in the module can be suppressed. As a result, necessary heat dissipation performance can be ensured even if material for a heat dissipation part such as a heat sink is reduced as compared with the conventional technique. Therefore, the cost of the material for the heat dissipation part can be reduced, and the size of the heat dissipation part can be reduced, so that it is possible to reduce the share of the volume of the heat dissipation part in the space.

As described above, according to the power supply of the second embodiment, when a plurality of switching elements in the same module is controlled to be turned on, a phase angle difference between the switching elements is set to a value obtained as a result of dividing the phase angle of one control cycle by the number of the switching elements in the same module. As a result, the range of duty ratio that may cause an overcurrent error can be reduced.

Third Embodiment

Figure 9:
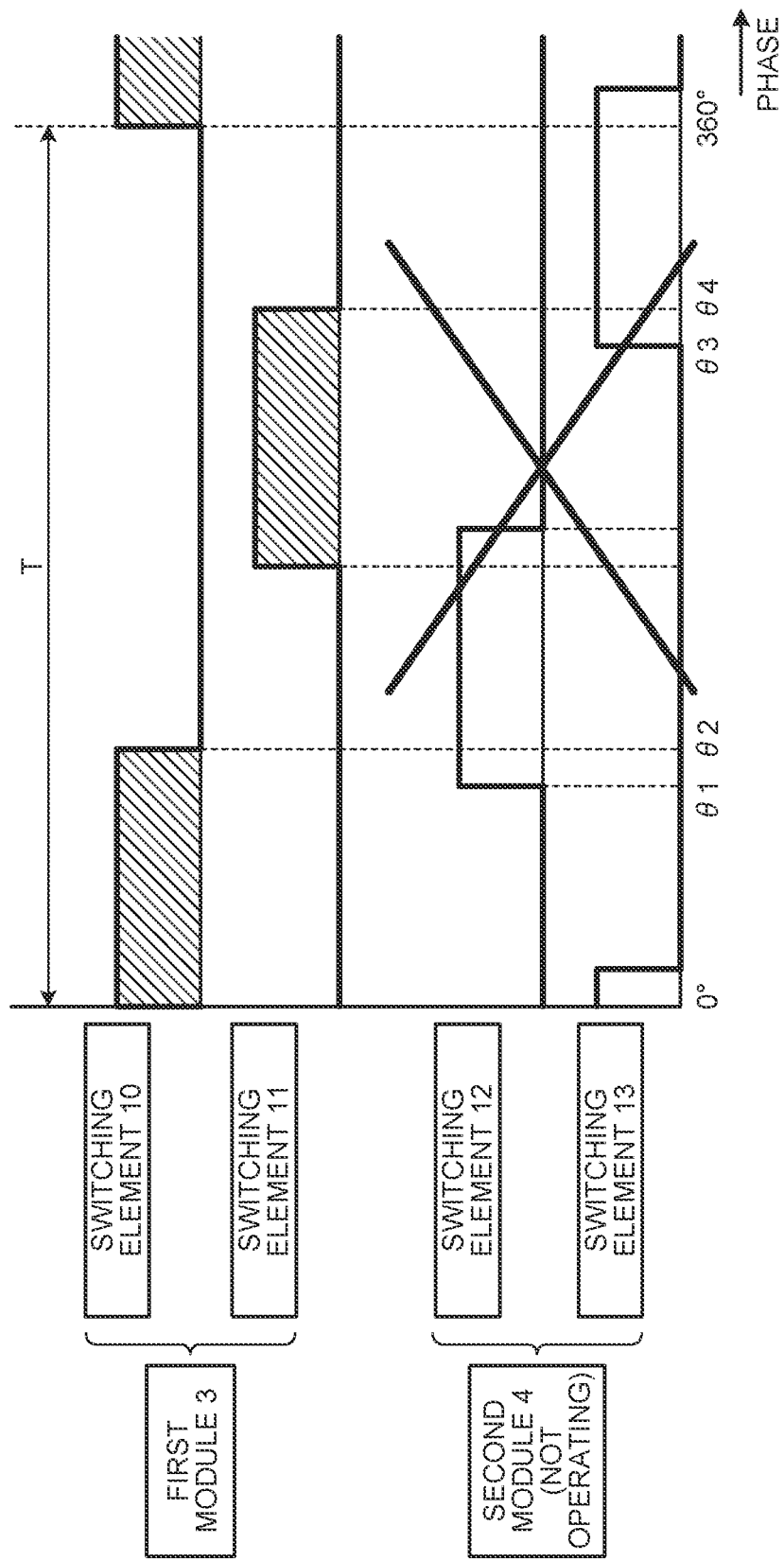
FIG. 9 is a diagram illustrating switching patterns to be used for describing the operation of a third embodiment.

In a third embodiment, a description will be given of operation control using the control based on the switching patterns proposed in the second embodiment and the effect of the operation control. FIG. 9 is a diagram illustrating switching patterns to be used for describing the operation of the third embodiment. Note that the switching patterns illustrated in FIG. 9 are the same as those illustrated in FIG. 5.

First, assume that the operation of either the first module 3 or the second module 4 is stopped by the overcurrent interruption function described in the first embodiment. At this time, if these modules are operated according to the switching patterns illustrated in, for example, FIG. 6, it becomes difficult for the power supply 100 to operate when either of the modules is stopped.

Therefore, the modules are operated according to the switching patterns of FIG. 5 described in the second embodiment. FIG. 9 illustrates a situation in which the operation of the second module 4 is in a stopped state. Looking only at the switching patterns of the first module 3 that is not in the stopped state in FIG. 9, it can be seen that the operation is based on the two-phase interleaving method where operation is performed with a phase angle difference of 180 degrees. Therefore, even if an overcurrent flows through the second module 4, and the second module 4 stops due to overcurrent interruption, the operation can be continued by the first module 3 that is not in the stopped state. That is, in the case of the example of FIG. 9, the operation is performed on the basis of the four-phase interleaving method at normal times, and during overcurrent interruption during which the operation of the second module 4 is stopped due to overcurrent, operation is performed by use of the first module 3 on the basis of the two-phase interleaving method. Such an operation mode provided in the power supply 100 makes it possible to avoid causing the operation of the entire device to be stopped due to overcurrent interruption, and to improve the stability of operation.

Note that the case where operation is continued by use of the first module 3 has been described above, but the present embodiment is not limited to this example. As another example, the following configuration may be adopted. Operation is performed by use of only the first module 3 while output is controlled so that the output does not exceed an output threshold value. Thus, the device is prevented from stopping momentarily. Then, the device is stopped after shifting to a stable state.

Furthermore, operation to be performed in the case of two modules has been described above in accordance with the configuration of the power supply 100 of FIG. 1, but it goes without saying that the present embodiment can be applied to a configuration including three or more modules. Here, let M be the number of modules (M is an integer equal to or greater than 2), and let L be the number of modules that have stopped operation due to overcurrent interruption (L is an integer equal to or greater than 1 and less than M). Furthermore, the number of switching elements in the same module is set to "two" here. In the case of this example, even if the L modules stop due to overcurrent interruption, operation can be continued by the (M−L) modules that are not in the stopped state. Moreover, in the case of this example, operation is performed on the basis of a 2M-phase interleaving method at normal times, and operation is performed on the basis of a 2(M−L)-phase interleaving method during overcurrent interruption. Note that even when the number of switching elements in the same module is three or more, such degenerate operation can be performed.

Furthermore, although the overcurrent interruption of the module has been described above, it goes without saying that the present embodiment can also be applied to the case where the module fails.

As described above, according to the power supply of the third embodiment, even when any of a plurality of the modules has been stopped due to overcurrent interruption, another of the plurality of modules continues operation, the another of the plurality of modules having not been stopped. As a result, it is possible to avoid causing the operation of the entire device to be stopped due to overcurrent interruption, and to improve the stability of operation of the power supply.

Fourth Embodiment

Figure 10:
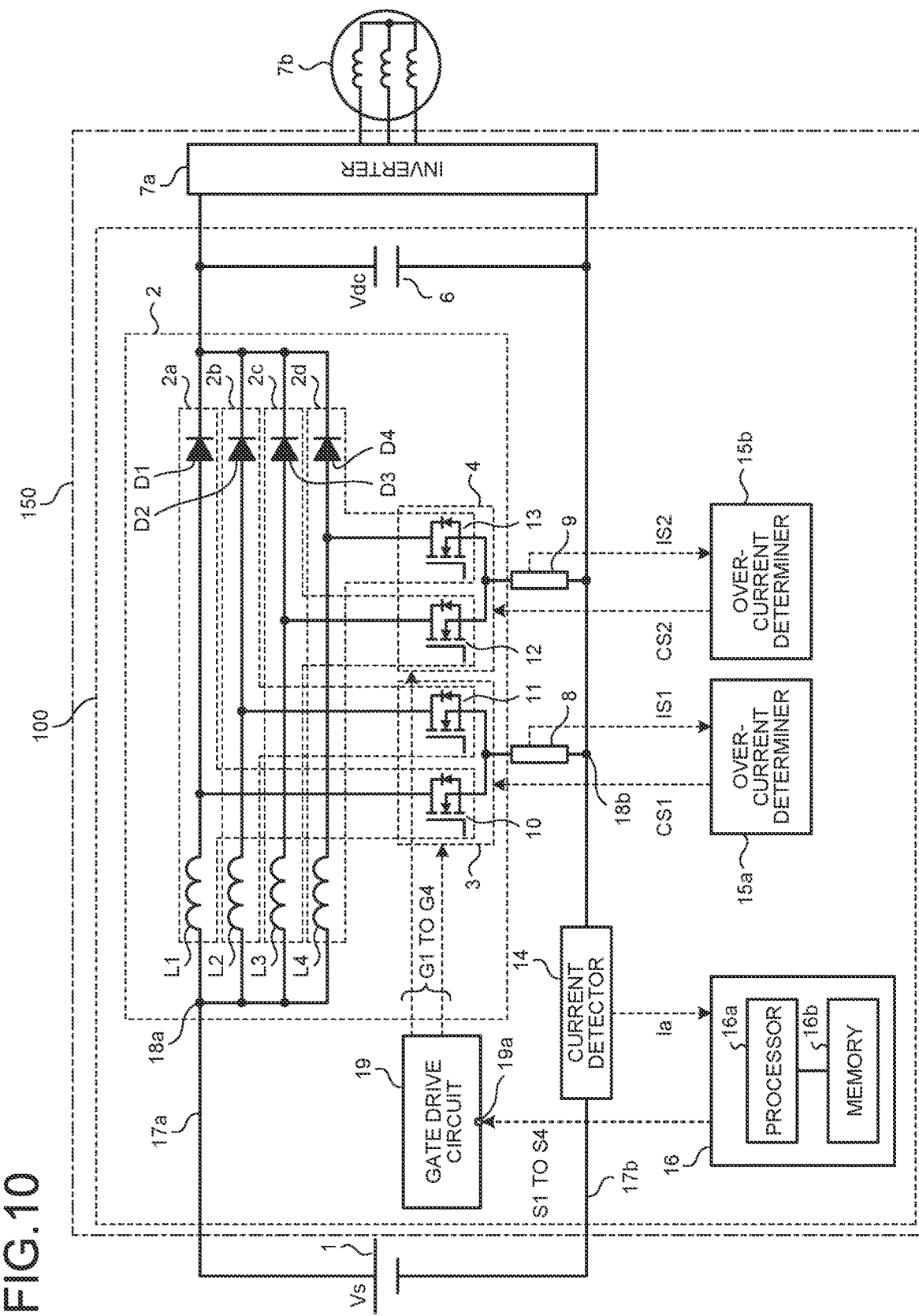
FIG. 10 is a diagram illustrating a configuration example of a motor driver according to a fourth embodiment.

FIG. 10 is a diagram illustrating a configuration example of a motor driver according to a fourth embodiment. As illustrated in FIG. 10, the power supply 100 described in the first embodiment can be applied to a motor driver that supplies DC power to an inverter. The following describes an example of applying the power supply 100 described in the first embodiment to the motor driver.

A motor driver 150 according to the fourth embodiment illustrated in FIG. 10 includes the power supply 100 illustrated in FIG. 1 and an inverter 7a. As described above, the power supply 100 is a device that converts AC power into DC power. The inverter 7a is a device that converts DC power output from the power supply 100 into AC power.

A motor 7b is connected to the output side of the inverter 7a. The inverter 7a drives the motor 7b by supplying the converted AC power to the motor 7b.

The motor driver 150 illustrated in FIG. 10 can be applied to products such as blowers, compressors, and air conditioners.

Figure 11:
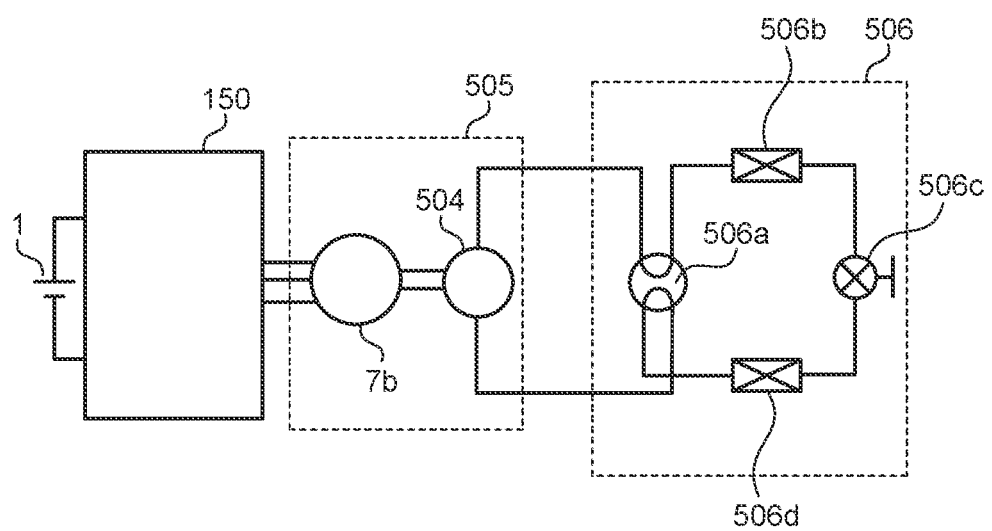
FIG. 11 is a diagram illustrating an example of applying the motor driver illustrated in FIG. 10 to an air conditioner.

FIG. 11 is a diagram illustrating an example of applying the motor driver 150 illustrated in FIG. 10 to an air conditioner. The motor 7b is connected to the output side of the motor driver 150, and is also connected to a compression element 504. A compressor 505 includes the motor 7b and the compression element 504. A refrigeration cycle unit 506 includes a four-way valve 506a, an indoor heat exchanger 506b, an expansion valve 506c, and an outdoor heat exchanger 506d.

The flow path of a refrigerant circulating inside the air conditioner is formed such that the refrigerant flows from the compression element 504 through the four-way valve 506a, the indoor heat exchanger 506b, the expansion valve 506c, and the outdoor heat exchanger 506d, and then flows through the four-way valve 506a again to return to the compression element 504. The motor driver 150 receives electric power supplied from the power source 1, and rotates the motor 7b. As the motor 7b rotates, the compression element 504 performs operation of compressing the refrigerant, so that the refrigerant can be circulated inside the refrigeration cycle unit 506.

The motor driver according to the fourth embodiment includes the power supply according to any of the first to third embodiments. As a result, the effect described in any of the first to third embodiments can be enjoyed in products such as blowers, compressors, and air conditioners to which the motor driver according to the fourth embodiment has been applied.

In addition, the configurations set forth in the above embodiments show examples of the subject matter of the present invention, and it is possible to combine the configurations with another technique that is publicly known, and is also possible to omit or change part of the configurations without departing from the gist of the present invention.

REFERENCE SIGNS LIST 1 power source; 2 converter circuit; 2a to 2d boost circuit; 3 first module; 4 second module; 6 smoothing capacitor; 7 load; 7a inverter; 7b motor; 8, 9, current detector; 10 to 13 switching element; 15a, 15b, 15a1, 15b1 overcurrent determiner; 16, 16A controller; 16a processor; 16b memory; 17a, 17b DC bus; 18a, 18b connection point; 19, 19A gate drive circuit; 19a, 19b, 19c input port; 100, 100A, 100B power supply; 150 motor driver; 504 compression element; 505 compressor; 506 refrigeration cycle unit; 506a four-way valve; 506b indoor heat exchanger; 506c expansion valve; 506d outdoor heat exchanger; D1 to D4 backflow prevention diode; L1 to L4 reactor.

The invention claimed is:

1. A power supply comprising:
a converter circuit including an even number of boost circuits, each of the even number of boost circuits including a reactor, a switching element, and a backflow prevention diode, the converter circuit boosting a voltage output from a power source;
a first-current detector detecting a first current flowing between the power source and the converter circuit;
at least one second-current detector provided for a plurality of certain boost circuits among the even number of boost circuits, the second-current detector detecting a second current, the second current being a sum current of currents flowing in the switching elements of the plurality of boost circuits; and
at least one overcurrent determiner equivalent in number to the second-current detector, the overcurrent determiner determining whether the second current is overcurrent on a basis of a detection value of the second current, wherein
the second-current detector is an overcurrent detector, and
the second-current detector detects the second current at a speed higher than a speed at which the first-current detector detects the first current, wherein
when a result of the determination made by the overcurrent determiner corresponding to the plurality of boost circuits indicates overcurrent, the plurality of boost circuits stop operating.

2. The power supply according to claim 1, further comprising:
a drive circuit driving a plurality of the switching elements, wherein
when the result of the determination made by the overcurrent determiner indicates overcurrent, the drive circuit stops switching operation of the switching elements in a switching module in which the overcurrent is flowing.

3. The power supply according to claim 1, further comprising:
a controller controlling a plurality of the switching elements on a basis of a detection value of the first current, wherein when the result of the determination made by the overcurrent determiner indicates overcurrent, the controller stops generating control signals for controlling the switching elements.

4. The power supply according to claim 1, wherein
at least one of a plurality of the switching elements is formed of a wide bandgap semiconductor.

5. The power supply according to claim 4, wherein
the wide bandgap semiconductor is silicon carbide, gallium nitride, gallium oxide, or diamond.

6. A motor driver comprising:
the power supply according to claim 1; and
an inverter converting DC power into AC power, the DC power being output from the power supply.

7. A blower comprising:
the motor driver according to claim 6.

8. A compressor comprising:
the motor driver according to claim 6.

9. An air conditioner comprising:
the power supply according to claim 1;
a motor driver including an inverter converting DC power into AC power, the DC power being output from the power supply; and
at least either a blower including the motor driver or a compressor including the motor driver.

10. A power supply comprising:
a converter circuit including an even number of boost circuits, each of the even number of boost circuits including a reactor, a switching element, and a backflow prevention diode, the converter circuit boosting a voltage output from a power source;
a first-current detector detecting a first current flowing between the power source and the converter circuit;
at least one second-current detector provided for a plurality of certain boost circuits among the even number of boost circuits, the second-current detector detecting a second current, the second current being a sum current of currents flowing in the switching elements of the plurality of boost circuits; and
at least one overcurrent determiner equivalent in number to the second-current detector, the overcurrent determiner determining whether the second current is overcurrent on a basis of a detection value of the second current, wherein
the second-current detector is an overcurrent detector, and
the second-current detector detects the second current with an accuracy lower than an accuracy with which the first-current detector detects the first current, wherein
when a result of the determination made by the overcurrent determiner corresponding to the plurality of boost circuits indicates overcurrent, the plurality of boost circuits stop operating.

11. The power supply according to claim 10, further comprising:
a drive circuit driving a plurality of the switching elements, wherein
when the result of the determination made by the overcurrent determiner indicates overcurrent, the drive circuit stops switching operation of the switching elements in a switching module in which the overcurrent is flowing.

12. The power supply according to claim 10, further comprising:
a controller controlling a plurality of the switching elements on a basis of a detection value of the first current, wherein when the result of the determination made by the overcurrent determiner indicates overcurrent, the controller stops generating control signals for controlling the switching elements.

13. The power supply according to claim 10, wherein at least one of a plurality of the switching elements is formed of a wide bandgap semiconductor.

14. The power supply according to claim 13, wherein the wide bandgap semiconductor is silicon carbide, gallium nitride, gallium oxide, or diamond.

15. A motor driver comprising:
the power supply according to claim 10; and
an inverter converting DC power into AC power, the DC power being output from the power supply.

16. A blower comprising:
the motor driver according to claim 15.

17. A compressor comprising:
the motor driver according to claim 15.

18. An air conditioner comprising:
the power supply according to claim 10;
a motor driver including an inverter converting DC power into AC power, the DC power being output from the power supply; and
at least either a blower including the motor driver or a compressor including the motor driver.

19. A power supply comprising:
a converter circuit including an even number of boost circuits, each of the even number of boost circuits including a reactor, a switching element, and a backflow prevention diode, the converter circuit boosting a voltage output from a power source;
a first-current detector detecting a first current flowing between the power source and the converter circuit;
at least one second-current detector provided for a plurality of certain boost circuits among the even number of boost circuits, the second-current detector detecting a second current, the second current being a sum current of currents flowing in the switching elements of the plurality of boost circuits; and
at least one overcurrent determiner equivalent in number to the second-current detector, the overcurrent determiner determining whether the second current is overcurrent on a basis of a detection value of the second current, wherein
a plurality of the switching elements is connected in parallel forming a module in the converter circuit, and
the second-current detector is connected to the module on a one-to-one basis.

20. The power supply according to claim 19, wherein even when any of a plurality of the modules has been stopped due to overcurrent interruption, another of the plurality of modules continues operation, the another of the plurality of modules having not been stopped.

21. The power supply according to claim 19 or 20, wherein a number of the boost circuits is an even number equal to or greater than 4,
when a plurality of the switching elements in the same module is controlled to be turned on, a phase angle difference between the switching elements is a value obtained as a result of dividing a phase angle of one control cycle by a number of the switching elements in the same module, and
the one control cycle is a cycle period for switching control of the switching elements.

22. The power supply according to claim 21, wherein a phase angle difference in switching control between adjacent modules among a plurality of the modules is a value obtained as a result of dividing the phase angle of the one control cycle by a number of interleaved phases.

23. The power supply according to claim 19, further comprising:
a drive circuit driving a plurality of the switching elements, wherein
when the result of the determination made by the overcurrent determiner indicates overcurrent, the drive circuit stops switching operation of the switching elements in a switching module in which the overcurrent is flowing.

24. The power supply according to claim 19, further comprising:
a controller controlling a plurality of the switching elements on a basis of a detection value of the first current, wherein
when the result of the determination made by the overcurrent determiner indicates overcurrent, the controller stops generating control signals for controlling the switching elements.

25. The power supply according to claim 19, wherein at least one of a plurality of the switching elements is formed of a wide bandgap semiconductor.

26. The power supply according to claim 25, wherein the wide bandgap semiconductor is silicon carbide, gallium nitride, gallium oxide, or diamond.

27. A motor driver comprising:
the power supply according to claim 19; and
an inverter converting DC power into AC power, the DC power being output from the power supply.

28. A blower comprising:
the motor driver according to claim 27.

29. A compressor comprising:
the motor driver according to claim 27.

30. An air conditioner comprising:
the power supply according to claim 19;
a motor driver including an inverter converting DC power into AC power, the DC power being output from the power supply; and
at least either a blower including the motor driver or a compressor including the motor driver.

* * * * *